(12) United States Patent
Hirakawa et al.

(10) Patent No.: US 9,368,785 B2
(45) Date of Patent: Jun. 14, 2016

(54) SEALED BATTERY MANUFACTURING METHOD, SEALING MEMBER FOR SEALED BATTERY, AND SEALED BATTERY

(71) Applicants: TOYOTA JIDOSHA KABUSHIKI KAISHA, Toyota-shi, Aichi (JP); KOKOKU INTECH CO., LTD., Tokyo (JP)

(72) Inventors: Yasushi Hirakawa, Moriguchi (JP); Shinya Muroi, Kawagoe (JP)

(73) Assignees: TOYOTA JIDOSHA KABUSHIKI KAISHA, Aichi-ken (JP); KOKOKU INTECH CO., LTD., Tokyo (JP)

( * ) Notice: Subject to any disclaimer, the term of this patent is extended or adjusted under 35 U.S.C. 154(b) by 0 days.

(21) Appl. No.: 14/432,234

(22) PCT Filed: Sep. 5, 2013

(86) PCT No.: PCT/JP2013/073988
§ 371 (c)(1),
(2) Date: Mar. 30, 2015

(87) PCT Pub. No.: WO2014/069101
PCT Pub. Date: May 8, 2014

(65) Prior Publication Data
US 2015/0236336 A1    Aug. 20, 2015

(30) Foreign Application Priority Data
Nov. 5, 2012    (JP) .................................. 2012-243891

(51) Int. Cl.
*H01M 2/36*    (2006.01)
*H01M 10/052*    (2010.01)

(52) U.S. Cl.
CPC ............ *H01M 2/365* (2013.01); *H01M 10/052* (2013.01); *Y10T 29/4911* (2015.01)

(58) Field of Classification Search
CPC . H01M 2/365; H01M 10/052; Y10T 29/4911
See application file for complete search history.

(56) References Cited

U.S. PATENT DOCUMENTS

| | | | |
|---|---|---|---|
| 2011/0027645 A1 | 2/2011 | Komatsuki et al. | |
| 2011/0072648 A1 | 3/2011 | Yamauchi | |

FOREIGN PATENT DOCUMENTS

| | | |
|---|---|---|
| JP | 2003-229118 A | 8/2003 |
| JP | 2009-87659 A | 4/2009 |
| JP | 2009-181906 A | 8/2009 |
| JP | 2011-76865 A | 4/2011 |
| JP | 2012-169111 A | 9/2012 |
| JP | 2013-089322 A | 5/2013 |
| JP | 2013-101789 A | 5/2013 |

*Primary Examiner* — Brittany Raymond
(74) *Attorney, Agent, or Firm* — Sughrue Mion, PLLC

(57) ABSTRACT

A sealing member includes a metal lid, an elastic shaft, a supporting protrusion, and a tip portion. The tip portion has an engaging portion larger in diameter than a liquid inlet. The shaft portion has a diameter smaller than that of the liquid inlet and a shaft length longer than the thickness of the circumferential edge portion of the liquid inlet. A sealed battery manufacturing method includes: a temporary sealing step of pressure-contacting the engaging portion to the circumferential edge portion; a degassing step of forming a communication path by pushing the tip portion to such an extent that the lid part does not make contact with a battery case and the tip portion is apart from the circumferential edge portion; and a final sealing step of pressing the tip portion until the lid part makes contact with the battery case, thereby sealing the liquid inlet.

4 Claims, 11 Drawing Sheets

SEALED BATTERY MANUFACTURING METHOD, SEALING MEMBER FOR SEALED BATTERY, AND SEALED BATTERY

CROSS-REFERENCE TO RELATED APPLICATIONS

This is a US national phase application based on the PCT International Patent Application No. PCT/JP2013/073988 filed on Sep. 5, 2013, and claiming the priority of Japanese Patent Application No. 2012-243891 filed on Nov. 5, 2012, the entire contents of which are herewith incorporated by reference.

TECHNICAL FIELD

The present invention relates to a method for manufacturing a sealed battery such as a lithium ion secondary battery, and others, and more particularly to a technique of close up a liquid inlet for an electrolyte.

BACKGROUND ART

Sealed batteries such as lithium ion secondary batteries are utilized in various fields, e.g., electronic devices such as mobile phones and personal computers, and vehicles such as hybrid vehicles and electric vehicles. In particular, the lithium ion secondary batteries have high energy density and thus are preferably mounted in various kinds of devices.

One example of a method for manufacturing such a sealed battery is known as a method described below. Specifically, a power generating element (an electrode body) including a positive electrode sheet having positive active material and a negative electrode sheet having negative active material is housed in a battery case body made of metal and then a battery case is sealed (hermetically closed). Subsequently, an electrolyte is injected into the battery case through a liquid inlet provided in the battery case, impregnating the power generating element. Then, the liquid inlet is temporarily closed with an inlet plug (a sealing member).

Herein, a battery just fabricated (a battery assembly) is uncharged. Thus, this battery assembly is subjected to initial charge. The initial charge represents first charging to the fabricated battery. The initial charge will cause gas generation in the battery, resulting in an increase in internal pressure of the battery. Therefore, after the initial charge, the battery has to be released from the hermetically closed state once to release the gas.

This gas release (degassing) is performed by forming a degassing path allowing communication between inside and outside of the battery case via the liquid inlet provided in the battery case. After completion of degassing, the degassing path is sealed to bring the inside of the battery case into a hermetically closed state again. In this way, a sealed battery is produced.

A conventional art document related to the above type of battery manufacturing method is for example shown in Patent Document 1 listed below. In the technique disclosed in Patent Document 1, temporary sealing is performed by welding a film to a portion surrounding a liquid inlet of a battery case. Then, the film is cut or torn open to form a degassing path, thereby carrying out degassing. After degassing, another film is welded to close up the degassing path for second temporary sealing and further a metal member is welded (joined) from outside of the films for final sealing. According to this battery manufacturing method, in which the liquid inlet of the battery case is closed with the films, a pressure sealing property in a temporarily sealed state could be sufficiently ensured.

RELATED ART DOCUMENTS

Patent Documents

Patent Document 1: JP-A-2009-181906

SUMMARY OF INVENTION

Problems to be Solved by the Invention

However, the technique described in the above document has the following points to be improved. Specifically, the technique shown in the above document uses the films in the temporary sealing and the metal member in the final sealing. Accordingly, the number of components required for sealing the liquid inlet is complicated, leading to a complex manufacturing process accordingly. Further, the battery after the final sealing is in a doubly sealed state by sealing with the films (temporary sealing) and sealing with the welded metal member (final sealing). Therefore, the presence/absence of a welding defect (a joining failure) could not be easily inspected. In the technique described in the above document, specifically, the sealing state is held by the films. Even if the metal member has a welding defect, it would be difficult to easily inspect the hermeticity of the weld (the joined portion) by use of a gas sensor.

The present invention has been made in view of the circumstances and has a purpose to provide a method for manufacturing a sealed battery, capable of performing temporary sealing and final sealing by use of a single member and easily conducting hermeticity inspection of a joined portion by use of a gas sensor.

Means of Solving the Problems

To achieve the above purpose, one aspect of the invention provides a method for manufacturing a sealed battery including a battery case formed with a liquid inlet for injection of an electrolyte and a sealing member sealing the liquid inlet, wherein the sealing member includes: a lid part made of metal, a shaft portion which is an elastic body joined to one surface of the lid part, a supporting protrusion which is an elastic body surrounding, with a clearance, a periphery of an end portion of the shaft portion on a side close to the lid part, and a tip portion which is an elastic body extended from the shaft portion on a side opposite to the lid part, in an unloaded state, a separation distance between the supporting protrusion and the tip portion is smaller than a plate thickness of a circumferential edge portion of the liquid inlet, the tip portion includes an engagement portion having a larger diameter than a diameter of the liquid inlet, the shaft portion has a smaller diameter than the diameter of the liquid inlet and has an shaft length longer than the plate thickness of the circumferential edge portion of the liquid inlet. Herein, the unloaded state represents a state where no load is applied to the sealing member. This method for manufacturing a sealed battery includes: a temporary sealing step of bringing the engagement portion in pressure contact with the circumferential edge portion of the liquid inlet to temporarily hermetically seal the liquid inlet after injection of the electrolyte; an activating step of initially charging the sealed battery after the temporary sealing step; a degassing step of pushing the tip portion along a direction of the plate thickness of the circumferential edge portion of the liquid inlet after the activating step to such an extent that the lid part does not come into contact with the battery case and the tip portion separates from the circumferential edge portion of the liquid inlet to form a communication path allowing communication between inside and outside of the battery case to release gas generated in the battery case during the activating step; and a final sealing step of pushing the tip portion in the direction of the plate thickness of the circumferential edge portion of the liquid inlet after the degassing step until the lid part contacts with the battery case to compress the supporting protrusion between the lid part and the battery case, and joining the lid part to the battery case to seal the liquid inlet while the communication path remains formed inside the lid part.

According to the above manufacturing method, the engagement portion of the tip portion of the sealing member is larger in diameter than the liquid inlet. In the temporary sealing step, the engagement portion can hermetically seal the liquid inlet. Herein, in the unloaded state of the sealing member, a separation distance between the supporting protrusion and the tip portion is smaller than the plate thickness of the circumferential edge portion of the liquid inlet. Thus, the engagement portion of the tip portion and the inner surface of the circumferential edge portion of the liquid inlet are brought in close contact with each other, enabling strongly sealing the liquid inlet.

According to the above manufacturing method, since the diameter of the shaft portion of the sealing member is smaller than the diameter of the liquid inlet, a clearance or gap is generated between the shaft portion inserted in the liquid inlet and the inner peripheral surface of the liquid inlet. Further, since the shaft length of the shaft portion is longer than the plate thickness of the circumferential edge portion of the liquid inlet, the tip portion and the circumferential edge portion of the liquid inlet can be separated from each other. By the supporting protrusion, the lid part can be supported in a separate state from the battery case before joining. This supporting protrusion is configured to surround the shaft portion with a clearance from the periphery thereof. In the degassing step after activation, therefore, the tip portion is pushed in a direction of the plate thickness of the circumferential edge portion of the liquid inlet, thereby removing hermetical sealing of the liquid inlet provided by the engagement portion and foaming a communication path allowing communication between the inside and the outside of the battery case. Through this communication path, the gas generated in the battery case during the initial charge performed after the temporary sealing can be released to the outside of the battery case before joining (final sealing) of the lid part.

In the final sealing in the above-mentioned manufacturing method, the tip portion is further pushed in the direction of the plate thickness of the circumferential edge portion of the liquid inlet and also the lid part is joined to the battery case while the communication path remains formed inside the lid part. Therefore, the liquid inlet of the sealed battery manufactured by this method is sealed only by joining of the lid part and is not sealed by the tip portion, the shaft portion, and the supporting protrusion. Namely, the liquid inlet is not doubly sealed by further sealing in addition to joining of the lid part. Thus, a joining failure can be easily detected by use of a gas sensor.

According to the above manufacturing method, it is therefore possible to perform the temporary sealing step, the degassing step, and the final sealing step by a single component (the sealing member). Further, it is possible to check a joining failure in a finished battery.

In the method for manufacturing a sealed battery mentioned above, preferably, the sealing member is a member formed with a cutout in the tip portion, the cutout extending in a direction perpendicular to a direction to push into the liquid inlet. According to the above method, when the tip portion is being inserted in the liquid inlet, the tip portion is warped or bent by the thickness reduced, or thinning, by a cutout. This enables easy insertion of the tip portion into the liquid inlet.

Another aspect of the invention provides a sealing member of a sealed battery for sealing a liquid inlet for injection of an electrolyte from outside to inside of a battery case, wherein the sealing member includes: a lid part made of metal, a shaft portion which is an elastic body joined to one surface of the lid part, a supporting protrusion which is an elastic body surrounding, with a clearance, a periphery of an end portion of the shaft portion on a side close to the lid part, and a tip portion which is an elastic body extended from the shaft portion on a side opposite to the lid part, in an unloaded state, a separation distance between the supporting protrusion and the tip portion is smaller than a plate thickness of a circumferential edge portion of the liquid inlet, the tip portion includes an engagement portion having a larger diameter than a diameter of the liquid inlet and is separated from the circumferential edge portion of the liquid inlet in a state where the lid part is joined to the battery case, the shaft portion has a smaller diameter than the diameter of the liquid inlet and has an shaft length longer than the plate thickness of the circumferential edge portion of the liquid inlet, and the supporting protrusion is compressed between the lid part and the battery case in the state where the lid part is joined to the battery case.

Using the above configured sealing member of the sealed battery enables performing the temporary sealing step, the degassing step, and the final sealing step by a single component (the sealing member) as described above. Further, it is possible to check a joining failure in a finished battery.

Another aspect of the invention provides a sealed battery including a battery case formed with a liquid inlet for injection of an electrolyte and a sealing member sealing the liquid inlet. The sealing member includes: a lid part made of metal, a shaft portion which is an elastic body joined to one surface of the lid part, a supporting protrusion which is an elastic body surrounding, with a clearance, a periphery of an end portion of the shaft portion on a side close to the lid part, and a tip portion which is an elastic body extended from the shaft portion on a side opposite to the lid part, in an unloaded state, a separation distance between the supporting protrusion and the tip portion is smaller than a plate thickness of a circumferential edge portion of the liquid inlet. The lid part is joined to an outer surface of the battery case and closes the liquid inlet. The tip portion includes an engagement portion having a larger diameter than a diameter of the liquid inlet and is placed in the battery case and in a state separated from the circumferential edge portion of the liquid inlet. The shaft portion has a smaller diameter than the diameter of the liquid inlet and has a shaft length longer than the plate thickness of the circumferential edge portion of the liquid inlet, the shaft portion being located in the liquid inlet. The supporting protrusion is compressed between the lid part and the battery case. A communication path is provided inside the lid part to allow communication between inside and outside of the battery case.

According to the sealed battery configured as above, the liquid inlet is sealed only by joining of the lid and is not sealed by the tip portion, the shaft portion, and the supporting protrusion. In other words, the liquid inlet is doubly sealed by additional sealing other than the joining of the lid part. Accordingly, a joining failure can be easily detected by use of a gas sensor. According to the above-configured sealed battery, in the manufacturing process thereof, the temporary sealing step, the degassing step, and the final sealing step can be performed by a single component (the sealing member) as described above.

Effects of the Invention

According to the invention, temporary sealing and final sealing can be performed by a single member. In addition, hermeticity of a joined portion can be easily inspected by use of a gas sensor.

MODE FOR CARRYING OUT THE INVENTION

First Embodiment

Figure 1:
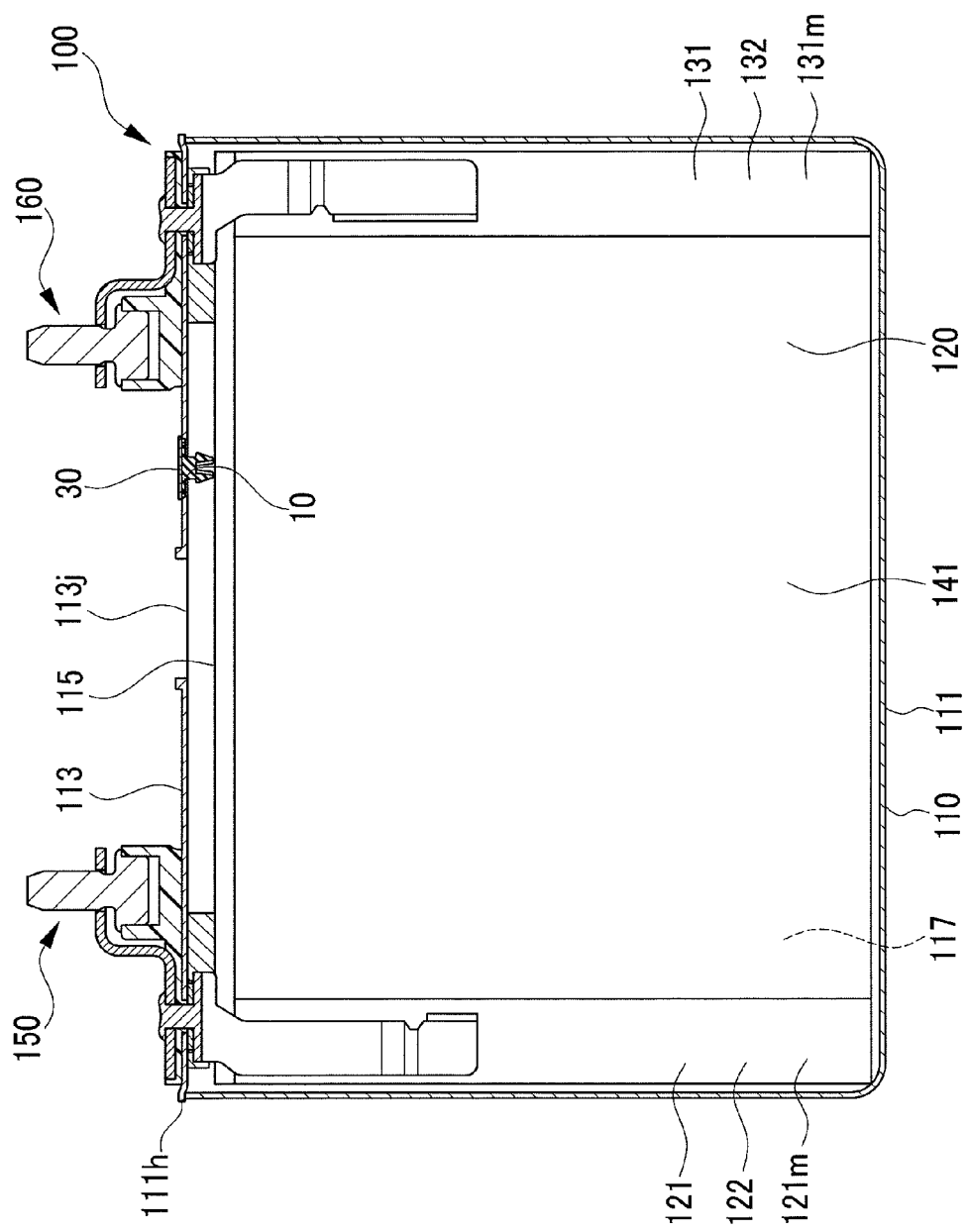
FIG. 1 is a vertical sectional view showing a battery in a first embodiment.
Figure 2:
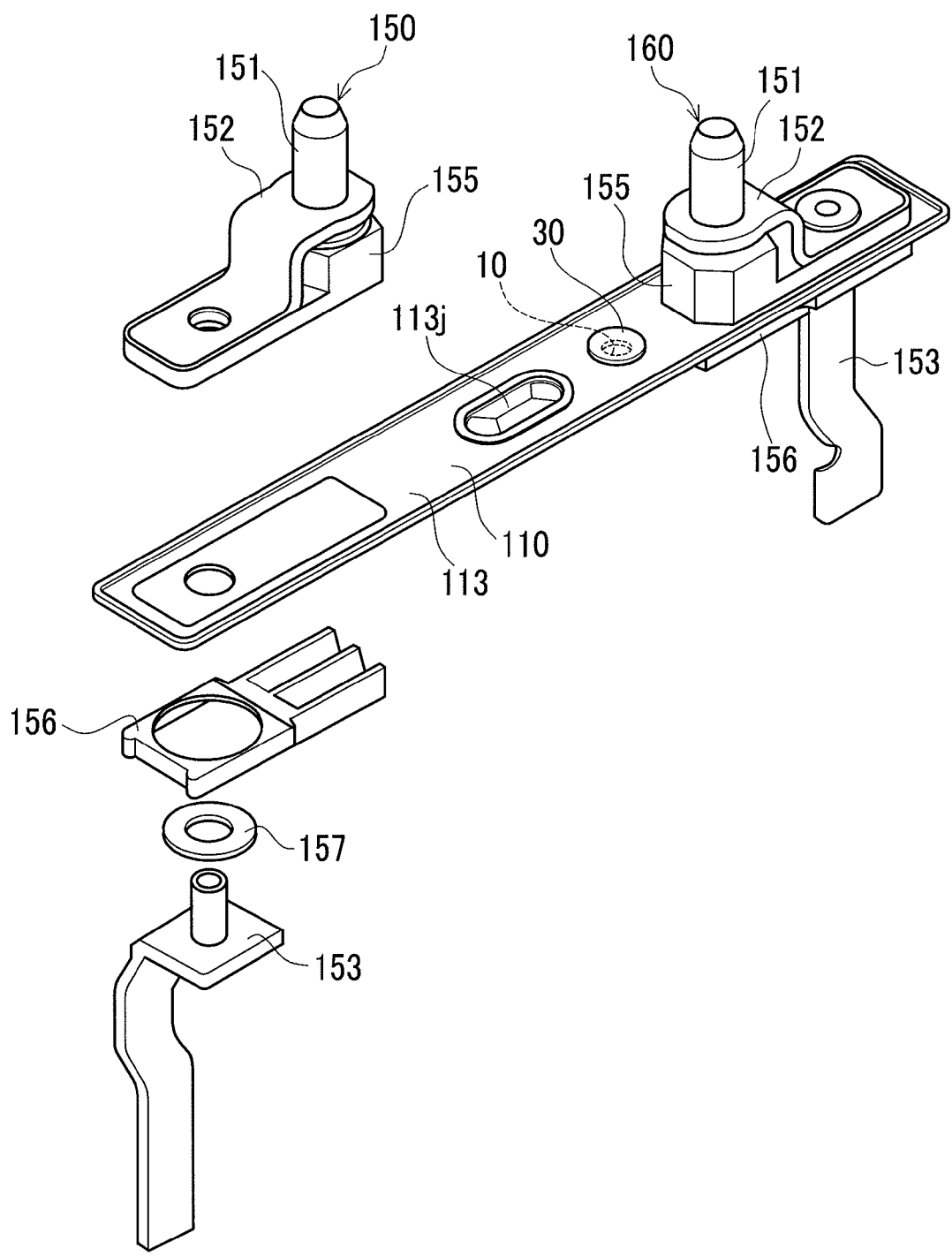
FIG. 2 is a perspective view showing the details of a case lid member, a positive terminal, a negative terminal, and others provided in the battery.

A detailed description of a preferred embodiment of the present invention will now be given referring to the accompanying drawings. FIG. 1 is a lithium ion secondary battery (a sealed battery) 100 (hereinafter, also simply referred to as a "battery 100"). FIG. 2 shows the details of a case lid member 113, a positive terminal 150, a negative terminal 160, and others.

This battery 100 is a rectangular battery to be mounted in a vehicle such as a hybrid vehicle and an electric vehicle or in a battery using device such as a hammer drill. As shown in FIG. 1, this battery 100 is constituted of a rectangular battery case 110, a wound electrode body (a power generating element) 120 housed in this battery case 110, the positive terminal 150 and the negative terminal 160 each supported in the battery case 110, and others. The electrode body 120 is impregnated with a non-aqueous electrolyte 117. In the present description, unless otherwise noted, upper, lower, right, and left sides are defined with reference to FIG. 1, and a short side of a drawing sheet of FIG. 1 is defined as a front side and a far side of the drawing sheet is defined as a rear side.

The battery case 110 is made of metal, concretely, aluminum. The battery case 110 consists of a box-shaped case body 111 opening only in its upper side, and a rectangular plate-like case lid member 113 welded to the case body 111 to close an opening 111h of the case body 111. The case lid member 113 is provided with a safety valve 113j which will be fractured or broken when the internal pressure of the battery case 110 reaches a predetermined pressure (see FIGS. 1 and 2). This case lid member 113 is further provided with a liquid inlet 10. This liquid inlet 10 is hermetically sealed with a sealing member 30. These liquid inlet 10 and sealing member 30 will be described in detail later.

The case lid member 113 is attached with the positive terminal 150 and the negative terminal 160. As shown in FIG. 2, each of the positive terminal 150 and the negative terminal 160 is made up of three terminal metal parts 151, 52, and 153. Further, each of the positive terminal 150 and the negative terminal 160 is put together through three insulating members 155, 156, and 157. As shown in FIG. 1, in the battery case 110, the positive terminal 150 is connected to a positive electrode sheet 121 (concretely, a positive current collecting part 121m of the positive electrode sheet 121) of the electrode body 120. The negative terminal 160 is connected to a negative electrode sheet 131 (a negative current collecting part 131m of the negative electrode sheet 131) of the electrode body 120.

The electrode body 120 is enclosed in an insulating film envelope 115 formed of a back-like insulating film opening only on an upper side and is housed in a sideways orientation in the battery case 110. This electrode body 120 is produced in such a manner that the positive electrode sheet 121 and the negative electrode sheet 131, each having a strip shape, are wound together in an overlapping state by interposing strip-shaped breathable separators 141 between the sheets 121 and 131, and compressed in a flattened shape.

The positive electrode sheet 121 includes a positive current collecting foil (a positive core member) 122 formed of a strip-shaped aluminum foil and provided with positive active material layers. The positive active material layers are made of a positive active material, a conductive material, and a binder. The negative electrode sheet 131 includes a negative current collecting foil (a negative core member) 132 formed of a strip-shaped copper foil and provided with negative active material layers. The negative active material layers are made of a negative active material, a binder, and a thickening agent. The separators 141 are each a strip-shaped resin, more concretely, a porous film made of polypropylene (PP) and polyethylene (PE).

Figure 3:
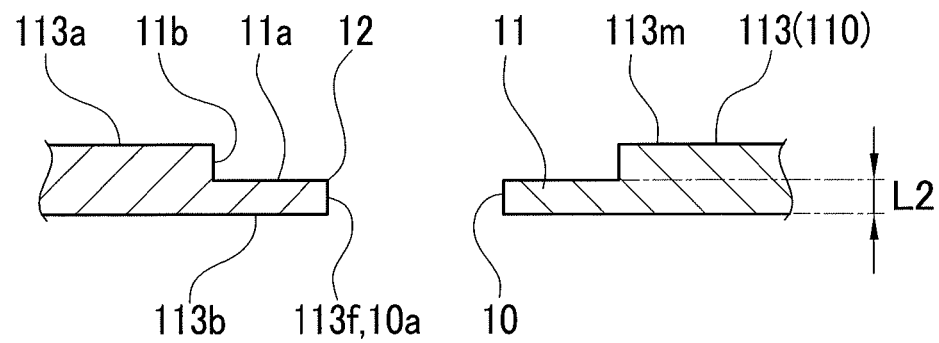
FIG. 3 is an end view showing a liquid inlet provided in a case lid member in the first embodiment.

The liquid inlet 10 and the sealing member 30 will be explained in detail below. The liquid inlet 10 is a hole formed in the case lid member 113 of the battery case 110 as shown in FIG. 3 to inject therethrough the electrolyte 117 into the battery case 110. The liquid inlet 10 provides communication between the inside and the outside of the battery case 110. Around the liquid inlet 10, there is formed an annular step surface 11a lowered than an upper surface 113a of the case lid member 113. It is to be noted that both the upper surface 113a and the step surface 11a are outer surfaces of the battery case. The liquid inlet 10 is a circular hole defined by an inner wall surface 113f of the case lid member 113. The inner wall surface 113f is also an inner peripheral surface 10a of the liquid inlet 10. The step surface 11a is located above a center in a thickness direction (a plate thickness direction) of the case lid member 113. The step surface 11a and the upper surface 113a of the case lid member 113 are continuous via a cylindrical surface 11b. A circular hole surrounded by the cylindrical surface 11b is larger in diameter than the liquid inlet 10 defined by the inner peripheral surface 10a. To be concrete, the size of the liquid inlet 10 formed by the inner peripheral surface 10a has a diameter of about 1.6 mm and a height of about 1.05 mm. The size of the circular hole formed by the cylindrical surface 11b has a diameter of 3.8 mm and a height of 0.35 mm.

Figure 4:
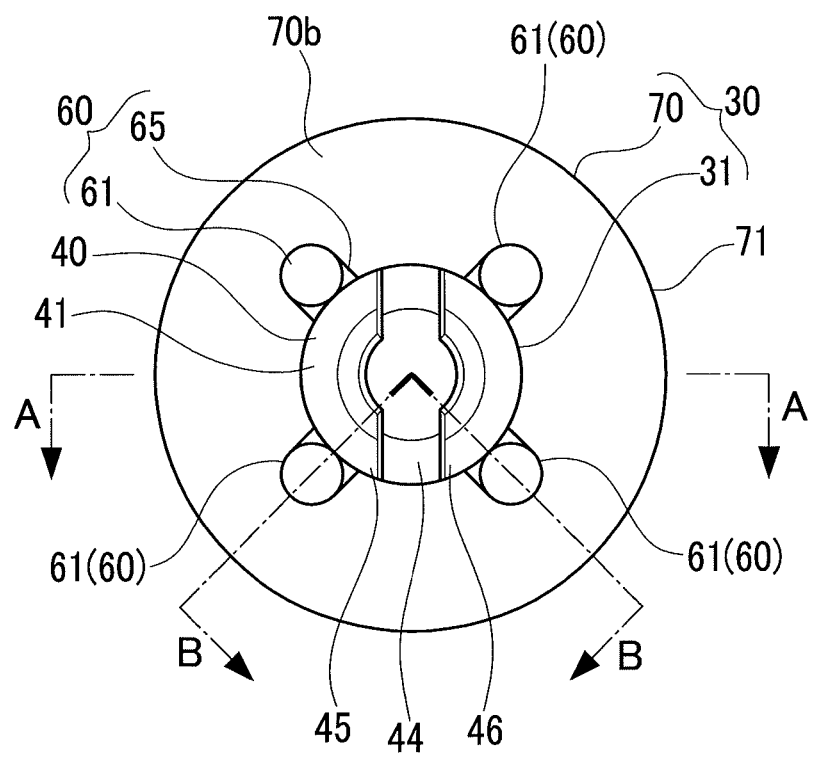
FIG. 4 is a bottom view showing a sealing member provided in the battery in the first embodiment.
Figure 5:
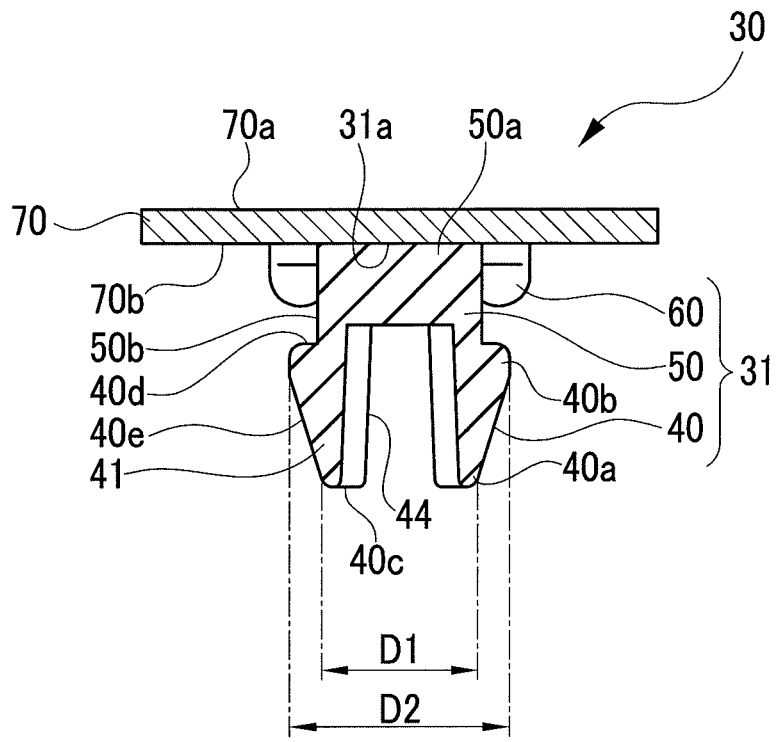
FIG. 5 is a cross sectional view taken along a line A-A in FIG. 4.
Figure 6:
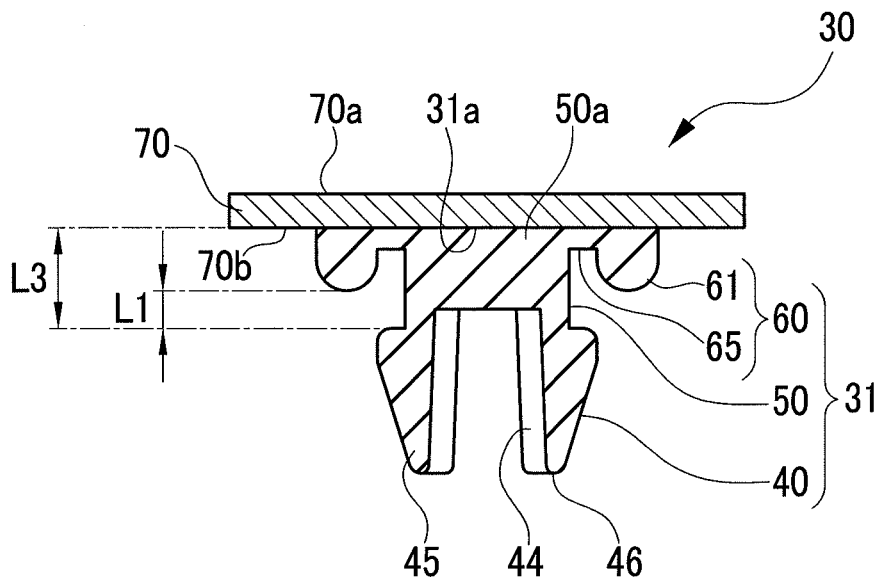
FIG. 6 is a cross sectional view taken along a line B-B in FIG. 4.

The sealing member 30 consists of an insert part 31 and a lid part 70 as shown in FIGS. 4 to 6. FIG. 4 is a bottom view of the sealing member 30. FIG. 5 is a sectional view taken along a line A-A in FIG. 4. FIG. 6 is a sectional view taken along a line B-B in FIG. 4. The lid part 70 is made of the same material as that of the battery case 110, i.e., aluminum. This lid part 70 has a circular disk-like shape having a first main surface (an outer surface) 70a and a second main surface (an inner surface, a back surface) 70b. The lid part 70 has a diameter of about 5.0 mm. An upper surface 31a of the insert part 31 is joined to the center of the second main surface 70b of the lid part 70, so that the lid part 70 and the insert part 31 are made integral.

The insert part 31 is made of resin material having rubber elasticity. Concretely, the insert part 31 is made of ethylene propylene rubber (EPDM). EPDM is a rubber material having adjustable hardness. Accordingly, as long as the hardness of the insert part 31 is appropriately adjusted, optimal sealing property to the liquid inlet 10 can be ensured according to the internal pressure of the battery 100. Furthermore, a push load to be applied to insert the insert part 31 in the liquid inlet 10 can be appropriately adjusted. For the insert part 31, any other rubber materials such as nitrile rubber (NBR) and styrene-butadiene rubber (SBR) may also be used as well as EPDM.

This insert part 31 includes a tip portion 40, a shaft portion 50, and protruding portions 60 in this order from bottom toward the lid part 70 in FIG. 5. The shaft portion 50 has a columnar shape extending in a vertical direction. The shaft portion 50 is inserted through the liquid inlet 10 in a fully assembled state of the sealing member 30 (see FIG. 9). The diameter of the shaft portion 50 in cross section is 1.5 mm, slightly smaller than the diameter of the liquid inlet 10. Accordingly, a gap or clearance is formed between the shaft portion 50 and the inner peripheral surface 10a of the liquid inlet 10. The shaft length of the shaft portion 50 (the shaft length in the plate thickness direction of the circumferential edge portion 11 of the liquid inlet 10 in the case lid member 113 (see FIG. 3), further namely, the shaft length in a penetrating direction (an up-and-down direction) of the liquid inlet 10) is longer than the thickness of the liquid inlet 10 itself. Therefore, when the shaft portion 50 is inserted through the liquid inlet 10, the tip portion 40 can come away from the inner surface 113b of the battery case 110 (see FIGS. 8 and 9).

Figure 7:
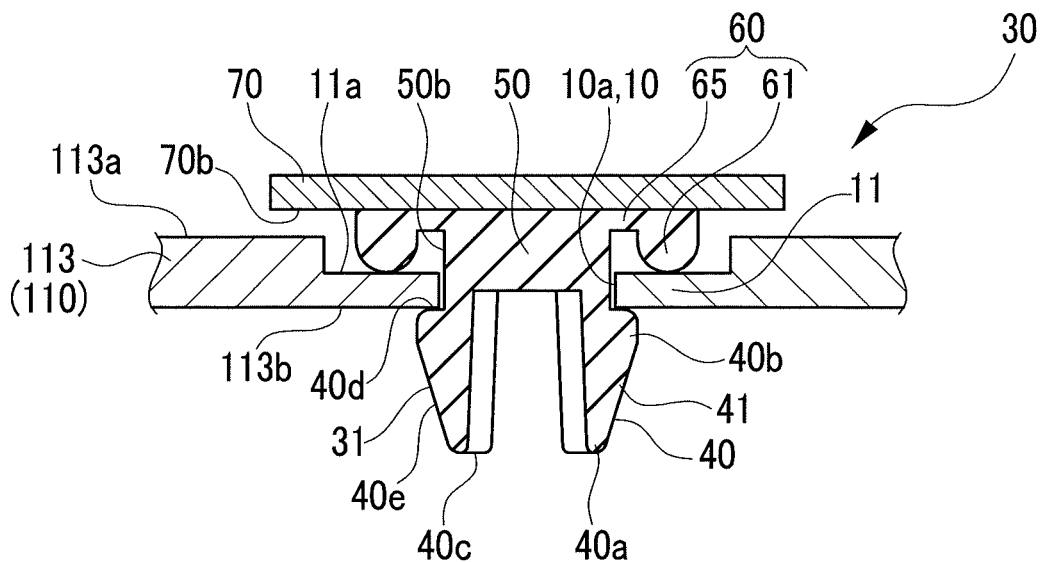
FIG. 7 is an end view showing a state where the liquid inlet is temporarily sealed with the sealing member.

The tip portion 40 has a nearly truncated conical shape including a first end portion 40a far from the shaft portion 50, a second end portion (a base end portion) 40b close to the shaft portion 50, and a tapered portion 41 as shown in FIG. 5. The tapered portion 41 is gradually increased in diameter from the first end portion 40a to the second end portion 40b. Namely, the tip portion 40 has a nearly truncated conical shape including a first end face 40c having a small diameter, a second end face (a base end face) 40d having a large diameter, and a side surface 40e joining them. The diameter (see D1 in FIG. 4) of the first end portion 40a is about 1.5 mm, slightly smaller than the diameter of the liquid inlet 10. The diameter (see D2 in FIG. 4) of the second end portion 40b is about 2.2 mm, slightly larger than the diameter of the liquid inlet 10. When this insert part 31 is to be inserted in the liquid inlet 10, the tapered portion 41 between the first end portion 40a and the second end portion 40b is brought in pressure contact with the circumferential edge portion 11 (see FIG. 3) of the liquid inlet 10, thereby elastically deforming the tip portion 40 to be pushed in. FIG. 7 shows a state where the tip portion 40 is pushed in the battery case 110 in the above manner.

Furthermore, as shown in FIGS. 4 and 5, the tip portion 40 is formed with a cutout 44 formed in a straight linear shape in bottom view. That is, the tip portion 40 is divided into a left tip portion 45 and a right tip portion 46 by the cutout 44. Accordingly, when the tip portion 40 is pushed in the liquid inlet 10, the left tip portion 45 and the right tip portion 46 are warped or bent to come close to each other. This allows easy insertion of the tip portion 40 into the liquid inlet 10. The cutout 44 has a straight-linear shape in bottom view but may have any other shape such as a Y shape or a cross shape. This Y shape or cross shape can further enhance insertability of the tip portion 40 than the straight linear shape. However, in the case of adopting the Y or cross shape, the rigidity of the tip portion 40 is lower than in the case of the straight linear shape and thus it is preferable to increase the rigidity of the tip portion 40 by just that much. This is because if the rigidity of the tip portion 40 is too low, the tip portion 40 may come or slip off the inside of the battery case 110 by a restoring force of the protruding portions 60 compressed between the lid part 70 and the case lid member 113 after the tip portion 40 is press-fitted in the battery case 110 (see FIG. 7). In this regard, the battery 100 in the present embodiment is configured such that the cutout 44 is shaped in a straight linear form to ensure easiness of inserting the tip portion 40 in the liquid inlet 10 to such an extent that the tip portion 40 does not come or slip off the liquid inlet 10. In the present embodiment, the cutout 44 is formed with a depth so as to reach the shaft portion 50 in the vertical direction (see FIG. 5). However, the cutout 44 is not necessarily required to be so deep as to reach the shaft portion 50.

The protruding portions 60 are provided to extend radially from an end portion 50a of the shaft portion 50 on a side close to the lid part 70 as shown in FIGS. 5 and 6. These protruding portions 60 are arranged in four positions spaced at an interval of 90° from each other as shown in FIG. 4. These four protruding portions 60 are placed with good balance with respect to the cutout 44.

Figure 8:
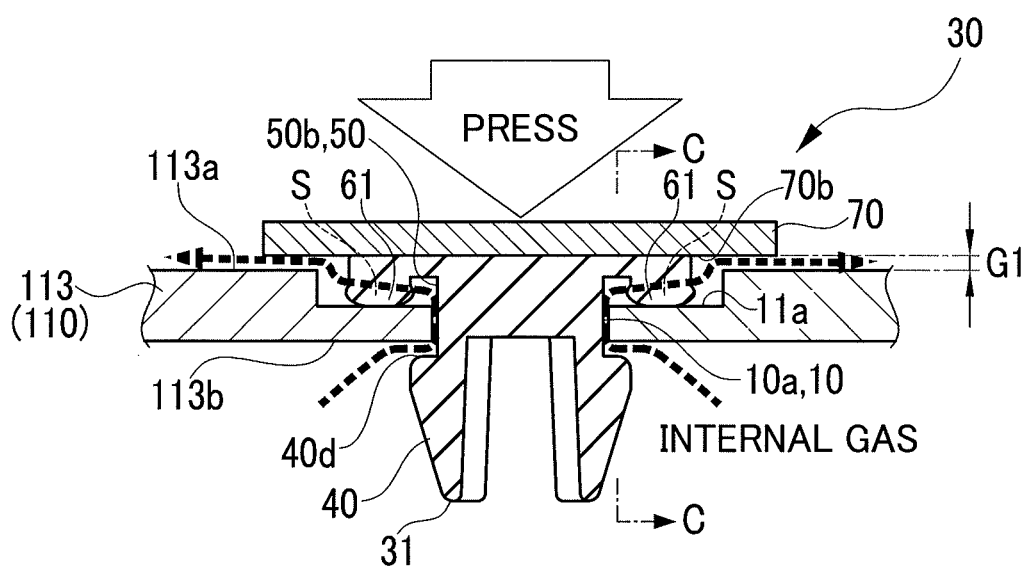
FIG. 8 is an end view showing a state where inside and outside of a battery case are communicated with each other through the liquid inlet.

Each of the protruding portions 60 includes a supporting protrusion 61 and an extended portion 65 joining the supporting protrusion 61 and the shaft portion 50 as shown in FIGS. 4 and 6. The supporting protrusions 61 are provided to form a clearance (see G1 shown in FIGS. 8 and 10) between the lid part 70 and the case lid member 113 in a state where the insert part 31 is inserted in the battery case 110. In other words, the supporting protrusions 61 protrude from a rear surface 70b of the lid part 70 toward the battery case 110 and serve to support the lid part 70 before welding in a separate state from the battery case 110 as shown in FIG. 8. While the four supporting protrusions 61 support the lid part 70, forming the clearance G1 (see FIGS. 8 and 10) between the lid part 70 and the case lid member 113, a space area S is formed between the step surface 11a and the rear surface 70b of the lid part 70. In the battery 100 in the present embodiment, therefore, the inside and the outside of the battery case 110 can be communicated with each other through the liquid inlet 10 and the space area S (see FIGS. 8 and 10).

Figure 9:
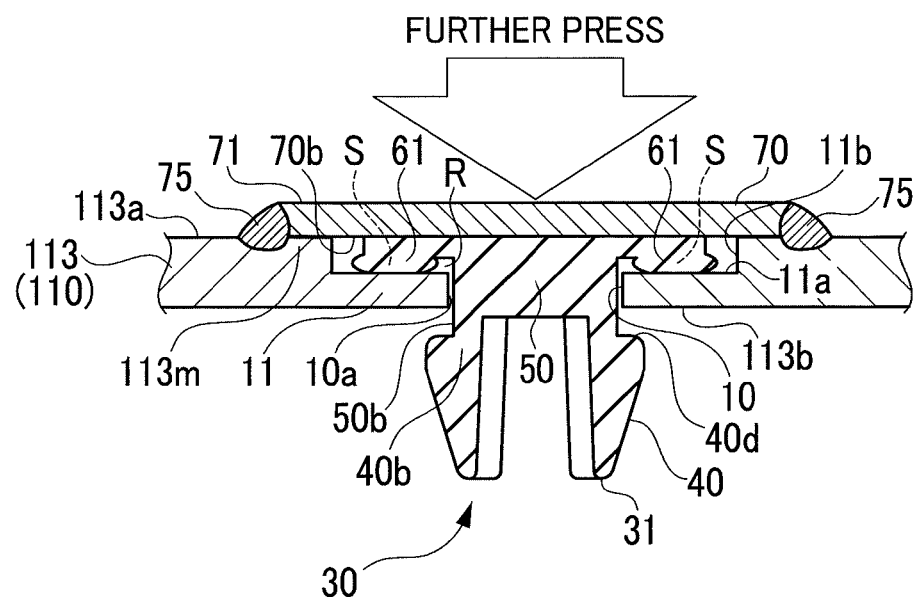
FIG. 9 is an end view showing a state where the liquid inlet is finally sealed by the sealing member.

This space area S remains formed even after final sealing mentioned later (see FIG. 9). To be concrete, as shown in FIG. 9, in the battery 100 after the final sealing, a base end face 40*d* of the tip portion 40 is spaced from the inner surface 113*b* of the case lid member 113 (in the present embodiment, a gap between the base end face 40*d* of the tip portion 40 and the inner surface 113*b* of the case lid member 113 is about 0.1 mm). The side surface 50*b* of the shaft portion 50 is spaced apart from the inner peripheral surface 10*a* of the liquid inlet 10. Furthermore, even though the supporting protrusions 61 are compressed between the step surface 11*a* and the lid part 70, the space area S is present. Specifically, gas generated in the battery case 110 is allowed to pass through the liquid inlet 10 and the space area S to reach the cylindrical surface 11*b*. It is to be noted that a gas flow path thus formed on the rear surface 70*b* side (inside) of the lid part 70 is referred to as a communication path R (a communication path R providing communication between the inside and the outside of the battery case 110).

The battery 100 after the final sealing shown in FIG. 9 is in a state where the lid part 70 is joined to the case lid member 113. To be concrete, an annular circumferential edge portion 71 along the outer peripheral edge of the lid part 70 and an annular hole-surrounding portion 113*m* surrounding the circumference (i.e., the circumference of the step surface 11*a*) of the liquid inlet 10 of the case lid member 113 are seamless welded to each other by laser welding. Accordingly, an annular weld 75 is formed. This welding provides hermetical sealing between the circumferential edge portion 71 of the lid part 70 and the hole-surrounding portion 113*m* of the case lid member 113. That is, the liquid inlet 10 is hermetically sealed.

A method for manufacturing the above battery 100 will be explained below. Firstly, the strip-shaped positive electrode sheet 121 and negative electrode sheet 131 separately produced are overlapped and wound by interposing therebetween the strip-shaped separators 141. Then, this is compressed in a flattened shape to finish the electrode body 120 (see FIG. 1).

Further, the case lid member 113 formed with the safety valve 113*j* and the liquid inlet 10 is prepared and assembled with the positive terminal 150 and the negative terminal 160 by use of the three kinds of terminal metal parts 151, 152, and 153 and the three kinds of insulating members 155, 156, and 157 (see FIG. 2). Subsequently, the positive terminal 150 is connected to the positive current collecting part 121*m* of the electrode body 120 and the negative terminal 160 is connected to the negative current collecting part 131*m* of the electrode body 120 (see FIG. 1).

Next, the case body 111 and the insulating film envelope 115 are prepared. The electrode body 120 is housed in the case body 111 through the insulating film envelope 115 and also the opening 111*h* of the case body 111 is closed by the case lid member 113. By laser welding, the case body 111 and the case lid member 113 are welded to each other, producing the battery case 110 (see FIG. 1).

Figure 11:
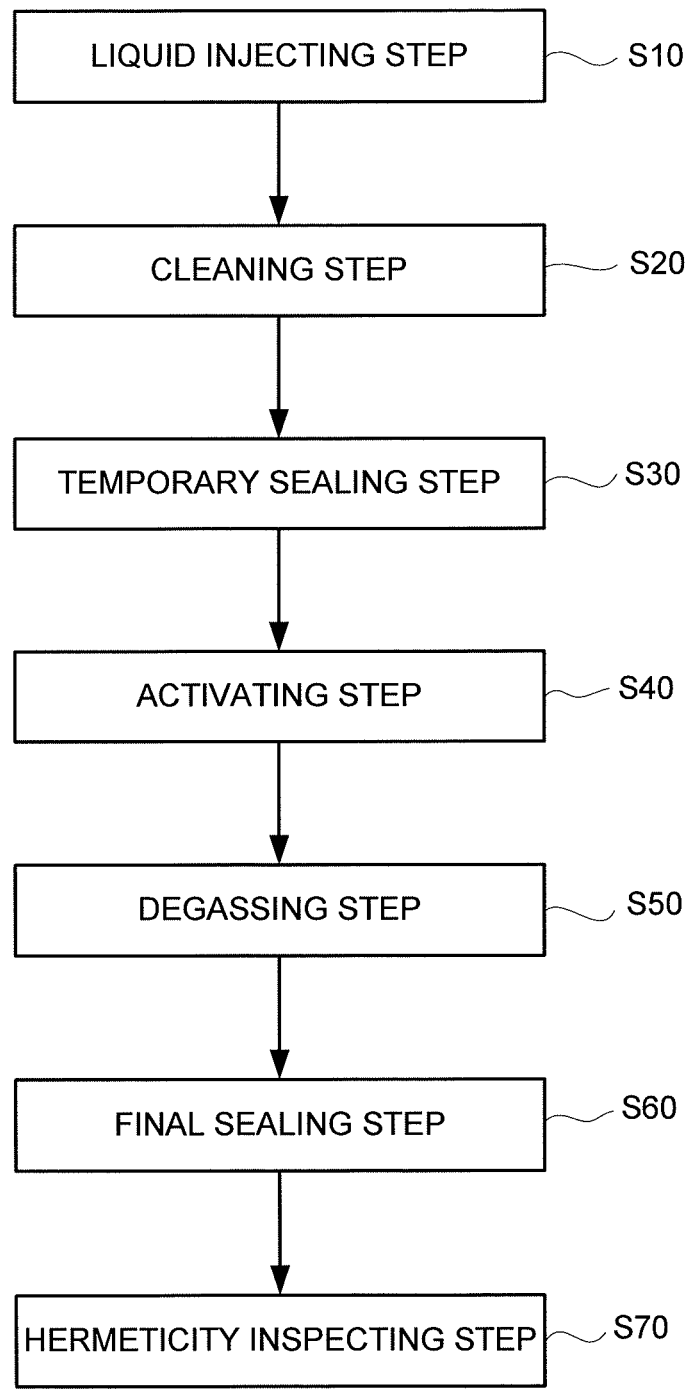
FIG. 11 is a flowchart showing a process of manufacturing the battery.

After production of the battery case 110, as shown in FIG. 11, a liquid injecting step (S10), a cleaning step (S20), a temporary sealing step (S30), an activating step (S40), a degassing step (S50), a final sealing step (S60), and a hermeticity inspecting step (S70) are sequentially performed to finish the battery 100. In the liquid injecting step, a liquid injecting nozzle is inserted in the liquid inlet 10 and the electrolyte 117 is injected into the battery case 110 through the nozzle. The circumference (including the hole-surrounding portion 113*m*) of the liquid inlet 10 is cleaned (the cleaning step). To be concrete, the circumference of the liquid inlet 10 is wiped with a nonwoven fabric. This cleaning step of cleaning the circumference of the liquid inlet 10 is performed because the electrolyte 117 may adhere to the circumference of the liquid inlet 10 during the above-mentioned injection of the electrolyte 117.

Successively, the liquid inlet 10 is temporarily sealed by use of the sealing member 30 (see FIGS. 4 to 6) consisting of the insert part 31 and the lid part 70 separately formed (the temporary sealing step). To be specific, as shown in FIG. 7, the tip portion 40 of the insert part 31 is press-fitted into the liquid inlet 10 from outside of the battery case 110. The tip portion 40 is then passed through the liquid inlet 10 and pushed into the battery case 110. In the battery 100 in the first embodiment, a separation distance (see L1 in FIG. 6) between the supporting protrusions 61 and the tip portion 40 in the direction of the plate thickness of the circumferential edge portion 11 of the liquid inlet 10 is smaller than the plate thickness (see L2 in FIG. 3) of the circumferential edge portion 11 of the liquid inlet 10. Accordingly, the tip portion 40 present inside the battery case 110 and the supporting protrusions 61 present outside the battery case 110 clamp the circumferential edge portion 11 of the liquid inlet 10. Thus, the base end face 40*d* of the base end portion 40*b* of the tip portion 40 comes into close contact with the inner surface 113*b* of the circumferential edge portion 11 of the liquid inlet 10. This results from compression stress occurring when the supporting protrusions 61 are somewhat compressed between the lid part 70 and the battery case 110. This close contact between the base end face 40*d* and the inner surface 113*b* causes the liquid inlet 10 to be hermetically sealed (temporarily sealed) from inside of the battery case 110. In the first embodiment, the base end portion 40*b* of the tip portion 40 corresponds to an engagement portion in claims. This base end portion 40*b* functions as a stopper to prevent the tip portion 40 from slipping or coming off the liquid inlet 10.

Figure 10:
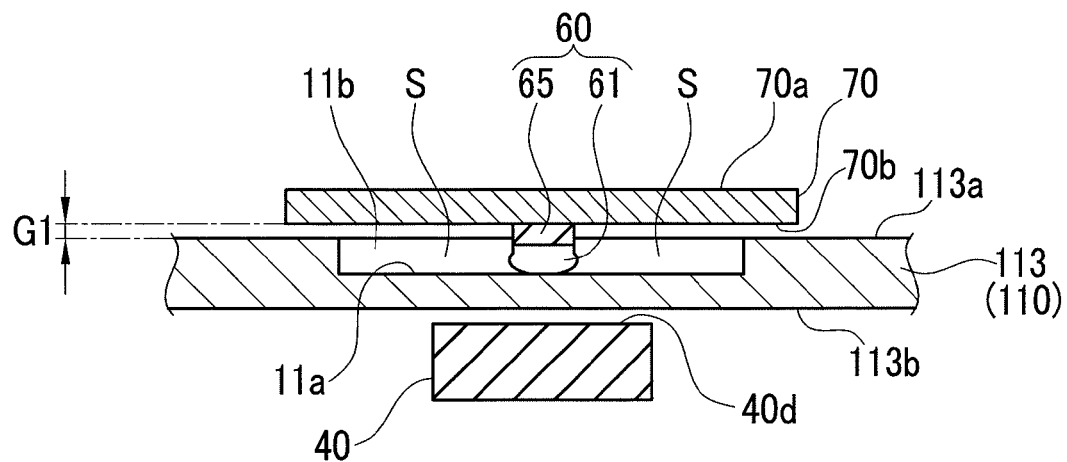
FIG. 10 is a sectional view taken along a line C-C in FIG. 8.

Subsequently, this battery 100 is subjected to the initial charge (also referred to as the activating step and the initial charging step). At that time, gas such as hydrogen gas occurs in the battery case 110. Thus, the degassing step is performed subsequent to the activating step. To be concrete, as shown in FIGS. 8 and 10, the lid part 70 is pressed down toward the battery case 110. Specifically, the insert part 31 is pushed in the liquid inlet 10. This brings the inside and the outside of the battery case 110 in communication with each other through the liquid inlet 10 and the space area S. That is, this pushing the insert part 31 is carried out to such an extent that the base end face 40*d* of the tip portion 40 separates from the inner surface 113*b* of the case lid member 113, but the rear surface 70*b* of the lid part 70 does not come into contact with the upper surface 113*a* of the case lid member 113. Accordingly, the gas generated in the battery case 110 in the activating step can be released to the outside of the battery case 110.

Then, the lid part 70 of the sealing member 30 is welded by laser to the case lid member 113 (the final sealing step). To be concrete, as shown in FIG. 9, the lid part 70 is further depressed to push the insert part 31 with respect to the liquid inlet 10, thereby bringing the rear surface 70*b* of the lid part 70 in pressure contact with the upper surface 113*a* of the case lid member 113. In this state, the circumferential edge portion 71 of the lid part 70 gets welded annularly by laser to the hole-surrounding portion 113*m* of the case lid member 113. Accordingly, the liquid inlet 10 is hermetically sealed. In the battery 100 after the final sealing, the tip portion 40 and the shaft portion 50 are out of contact with the battery case 110. Further, the space area S is formed by the supporting protrusions 61. Specifically, the supporting protrusions 61 surround the periphery of the shaft portion 50 with a clearance (the space area S). Thus, the liquid inlet 10 is sealed only by welding of the lid part 70, and is not doubly sealed by welding of the lid part 70 and pressure-contact with the insert part 31.

In a last stage, the hermeticity, or gastightness, between the lid part 70 and the hole-surrounding portion 113*m* is inspected (the hermeticity inspecting step). To be concrete, this battery 100 is put in a vacuum chamber, and then this vacuum chamber is depressurized (e.g., gauge pressure: −90 KPa). A gas sensor (e.g., Hydrogen Leak Detector H2000: Sensistor Technologies Inc.) is placed near the sealing member 30 and operated to detect gas for a predetermined period of time (e.g., for 120 seconds). In the battery 100 of the present embodiment, as described above, the liquid inlet 10 is not doubly sealed. In a case where the generation of gas is detected by the gas sensor, it reveals that a welding defect (a joining failure) has occurred between the lid part 70 and the hole-surrounding portion 113*m*. If the welding defect is detected, the relevant battery 100 is taken away. This is to ensure hermeticity reliability of the battery 100 to be manufactured. Through the above steps, the battery 100 is finished.

The battery 100 in the first embodiment includes, as explained above, the electrode body 120 (the power generating element), the battery case 110 having the liquid inlet 10 formed for the electrolyte 117 and internally housing the electrode body 120, and the sealing member 30 closing the liquid inlet 10. The sealing member 30 includes the tip portion 40 which is an elastic body placed in the battery case 110, the lid part 70 joined to the upper surface 113*a* (the outer surface) of the battery case 110 to close the liquid inlet 10, the shaft portion 50 continuous to the tip portion 40 and the lid part 70 and located in the liquid inlet 10, and the four supporting protrusions 61 which are elastic bodies provided around and spaced from the periphery of the shaft portion 50, each of the supporting protrusions 61 protruding from the lid part 70 toward the battery case 110. Specifically, the four supporting protrusions 61 are configured in such shape as to provide spaces along a direction from the central axis of the liquid inlet 10 to the outside.

The tip portion 40 includes the base end portion 40*b* (an engagement portion) formed to be thicker than the liquid inlet 10 (that is, larger in diameter than the liquid inlet 10). The base end portion 40*b* engages with the circumferential edge portion 11 of the liquid inlet 10 to seal the liquid inlet 10. The shaft portion 50 is formed to be thinner than the liquid inlet 10 (that is, smaller in diameter than the liquid inlet 10) and have an shaft length (see L3 in FIG. 6) longer than the plate thickness of the circumferential edge portion 11 of the liquid inlet in the battery case 110. Specifically, the shaft length of the shaft portion 50 is set to be so long as to enable taking the states shown in FIGS. 8 and 10. To be more concrete, this shaft length is set to such a length as to bring about a state where the tip portion 40 and the inner surface 113*b* of the battery case 110 are out of contact with each other and the inside and the outside of the battery case 110 are communicated with each other through the liquid inlet 10 and the space area S while the lid part 70 is supported in a position separated from the battery case 110 by the supporting protrusions 61. The supporting protrusions 61 are compressed between the rear surface 70*b* of the lid part 70 on the side close to the battery case 110 and the step surface 11*a* (the outer surface) of the battery case 110.

According to the battery 100 in the first embodiment configured as above, the liquid inlet 10 can be temporarily sealed by the tip portion 40 having the base end portion 40*b* (the engagement portion) thicker than the liquid inlet 10.

Furthermore, the shaft portion 50 is thinner than the liquid inlet 10. Accordingly, there is formed a clearance between the shaft portion 50 inserted through the liquid inlet 10 and the inner peripheral surface 10*a* of the liquid inlet 10. The shaft length of the shaft portion 50 is longer than the plate thickness of the circumferential edge portion 11 of the liquid inlet 10. Thus, while the shaft portion 50 is inserted in the liquid inlet 10, a clearance can be generated between the tip portion 40 and the inner surface 113*b* of the battery case 110. When the lid part 70 is joined to the battery case 110 (see FIG. 9), the supporting protrusions 61 are compressed between the lid part 70 and the battery case 110. In other words, the supporting protrusions 61 are not so firmly compressed before the lid part 70 is joined to the battery case 110 (see FIG. 8) as compared with after the lid part 70 is joined thereto. Accordingly, the supporting protrusions 61 can support the lid part 70 in a separate state with respect to the battery case 110 before joining. Furthermore, these supporting protrusions 61 surround the periphery of the shaft portion 50 with a clearance therefrom. Before joining of the lid part 70, therefore, the inside and the outside of the battery case 110 can be communicated with each other through the liquid inlet 10 and the clearance (the space area S) around the shaft portion 50 formed by the supporting protrusions 61. Therefore, the gas generated in the battery case 110 during the initial charge after the temporary sealing can be released to the outside of the battery case 110 before joining of the lid part 70 (the final sealing).

According to the battery 100 of the present embodiment, the liquid inlet 10 is sealed only by joining of the lid part 70, not sealed by the tip portion 40, the shaft portion 50, and the supporting protrusions 61. Specifically, the liquid inlet 10 is not in a doubly-sealed state provided by sealing excepting welding of the lid part 70. Thus, using the gas sensor enables easy detection of a joining failure.

In the battery 100 in the first embodiment, moreover, the separation distance (see L1 in FIG. 6) between the supporting protrusions 61 and the tip portion 40 in the plate thickness direction of the circumferential edge portion 11 of the liquid inlet 10 is smaller than the plate thickness (see L2 in FIG. 3) of the circumferential edge portion 11 of the liquid inlet 10. Before joining of the lid part 70, therefore, the tip portion 40 placed inside the battery case 110 and the supporting protrusions 61 placed outside the battery case 110 clamp the circumferential edge portion 11 around the liquid inlet 10 of the battery case 110. This makes it possible to bring the base end portion 40*b* of the tip portion 40 in close contact with the inner surface 113*b* of the circumferential edge portion 11 of the liquid inlet 10, thus temporarily sealing the liquid inlet 10. This temporarily sealed state is firmly maintained by the tip portion 40 and the supporting protrusions 61 clamping the battery case 110. Accordingly, as compared with sealing brought about by simply placing the tip portion 40 in pressure contact with the step surface 11*a* (the outer surface) of the circumferential edge portion 11 of the liquid inlet 10, the sealing member 30 is less likely to be pushed up due to the rise in internal pressure of the battery 100. According to the battery 100 in the first embodiment, therefore, the temporarily sealed state can be reliably maintained.

In the battery 100 in the first embodiment, the tip portion 40 includes the cutout 44 along the direction perpendicular to the plate thickness direction of the circumferential edge portion 11 of the liquid inlet 10. Accordingly, when the tip portion 40 is to be inserted in the liquid inlet 10, the tip portion 40 is warped or bent by the thickness reduced by the cutout 44. This enables easy insertion of the tip portion 40 into the liquid inlet 10.

The method for manufacturing the battery 100 in the first embodiment includes: the temporary sealing step of bringing the base end portion 40*b* (the engagement portion) in pressure contact with the liquid inlet 10 after injection of the electrolyte 117 to temporarily hermetically seal the liquid inlet 10; the activating step of initially charging the battery 100 after the temporary sealing step; the degassing step of pushing the tip portion 40 in the thickness direction of the circumferential edge portion 11 of the liquid inlet 10 to such an extent that the lid part 70 does not come into contact with the battery case 110 after the activating step, thereby making the inside and the outside of the battery case 110 communicate with each other through the liquid inlet 10 and the space area S to release the gas generated in the battery case 110 in the activating step; and the final sealing step of pushing the tip portion 40 in the thickness direction of the circumferential edge portion 11 of the liquid inlet 10 after the degassing step until the lid part 70 contacts with the battery case 110, and then welding (joining) the lid part 70 to the battery case 110 to finally seal the liquid inlet 10.

According to the manufacturing method as above, the temporary sealing, the degassing, and the final sealing can be performed singly by the sealing member 30. It is further possible to easily detect using a gas sensor or the like whether or not a failure or defect in welding made in the final sealing. Since the final sealing is carried out by welding, it provides more excellent sealing property than final sealing performed by caulking using a rivet.

Second Embodiment

Figure 12:
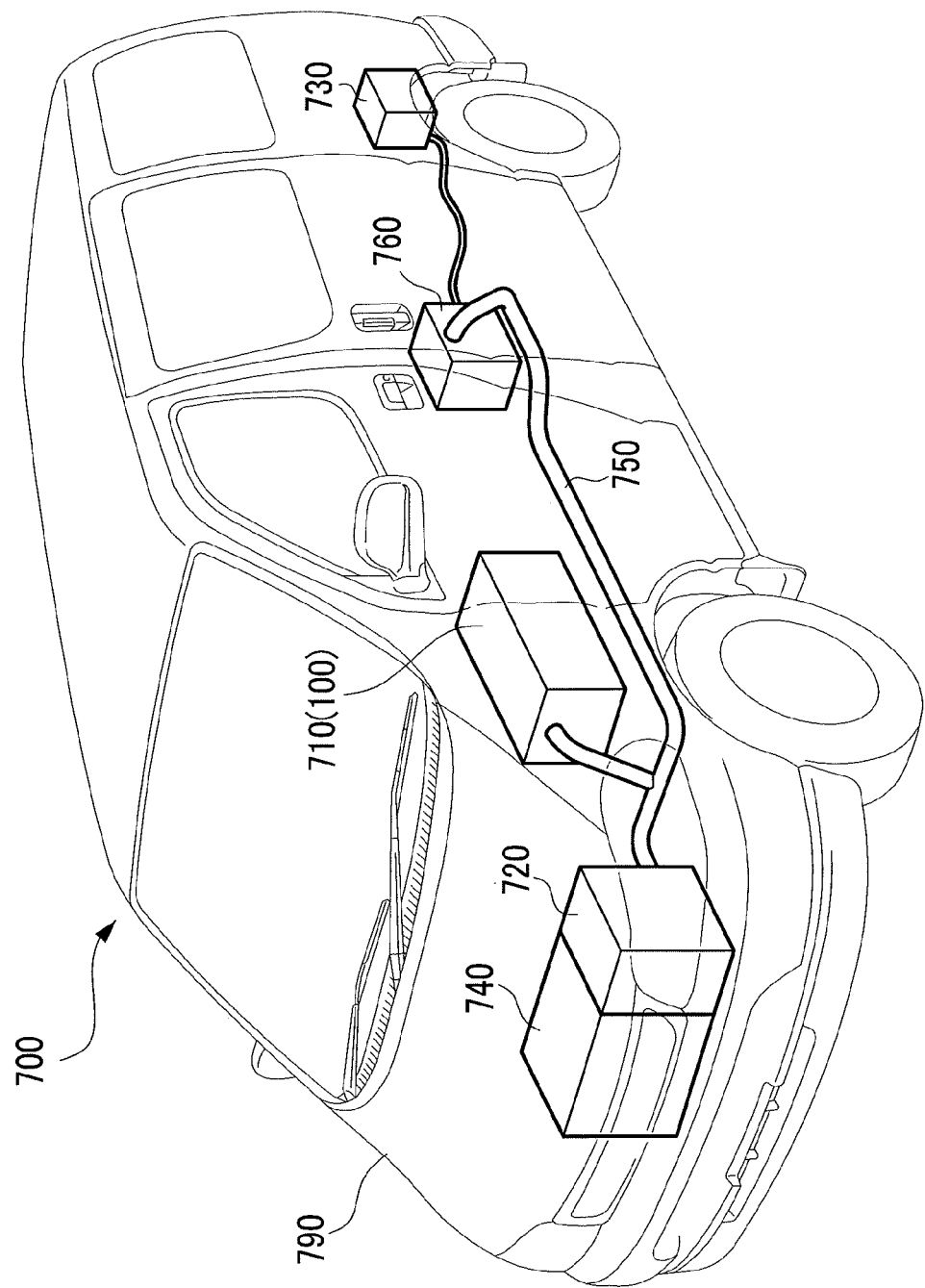
FIG. 12 is a view showing a vehicle in a second embodiment.

A second embodiment will be explained referring to FIG. 12. As shown in FIG. 12, a vehicle 700 in the second embodiment mounts therein an assembled battery 710 having the aforementioned lithium ion secondary battery 100 of the first embodiment and uses electric energy stored in this assembled battery 710 (the battery 100) as full or part of drive energy of a drive source.

This vehicle 700 is a hybrid vehicle that mounts the assembled battery 710 and is driven by an engine 740, a front motor 720, and a rear motor 730 in combination. Specifically, this vehicle 700 is provided with a vehicle body 790, the engine 740, a front motor 720 attached thereto, a rear motor 730, a cable 750, and an inverter 760. This vehicle 700 further includes the assembled battery 710 internally having a plurality of the batteries 100, 100, . . . , and utilizes the electric energy stored in the assembled battery 710 for driving the front motor 720 and the rear motor 730.

The battery 100 is a battery having been inspected on a welding defect after the final sealing as described above. Thus, there is at little risk of gas leakage due to a welding defect. Accordingly, the vehicle 700 mounting therein the above-mentioned batteries 100 can provide enhanced safety.

Third Embodiment

Figure 13:
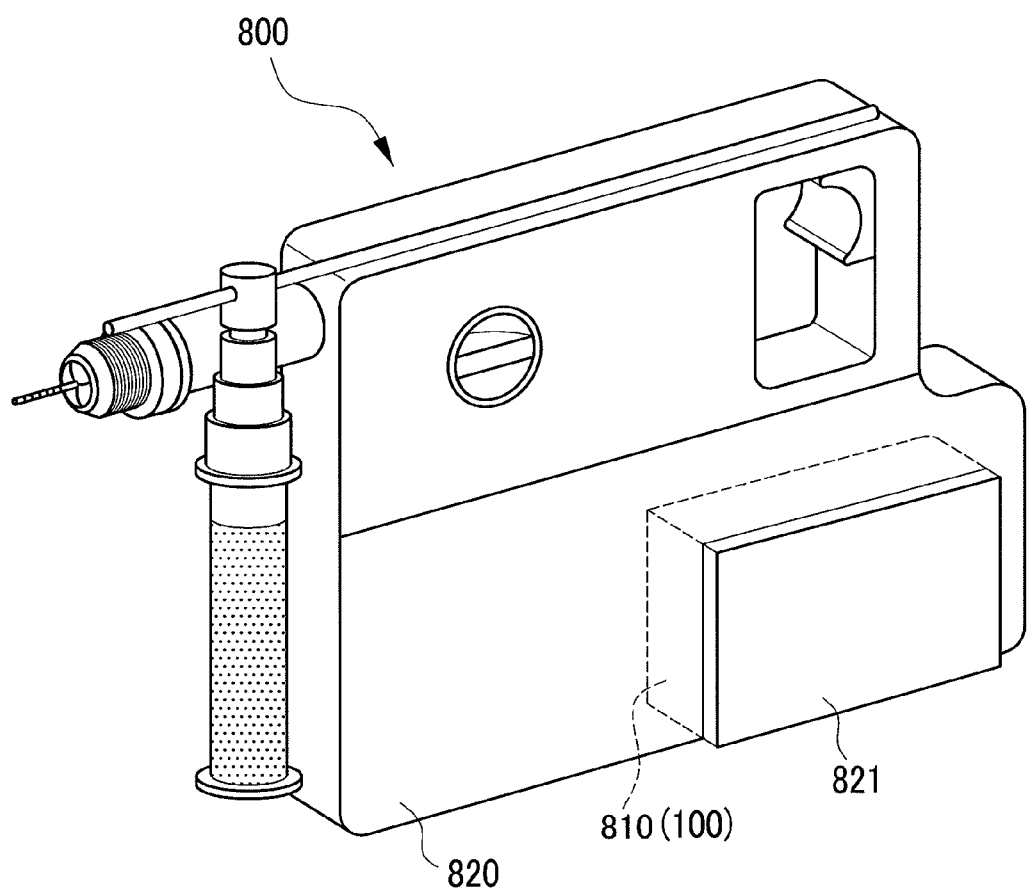
FIG. 13 is a view showing a battery using device in a third embodiment.

A third embodiment will be explained below referring to FIG. 13. As shown in FIG. 13, a battery using device 800 in the third embodiment mounts the lithium ion secondary battery 100 of the first embodiment ad uses this lithium ion secondary battery 100 as at least one of energy sources.

This battery using device 800 is a hammer drill that mounts a battery pack 810 including the battery 100 of the first embodiment. This battery using device 800 is configured such that the battery pack 810 is housed in a bottom part 821 of a main body 820. This battery pack 810 is utilized as an energy source to drive a drill.

Since the battery 100 is a battery having undergone an inspection on a welding defect after the final sealing as described above, there is at little risk of gas leakage due to the welding defect. Accordingly, the battery using device 800 mounting therein the above-mentioned battery 100 can provide enhanced safety.

Modified Examples

Figure 14:
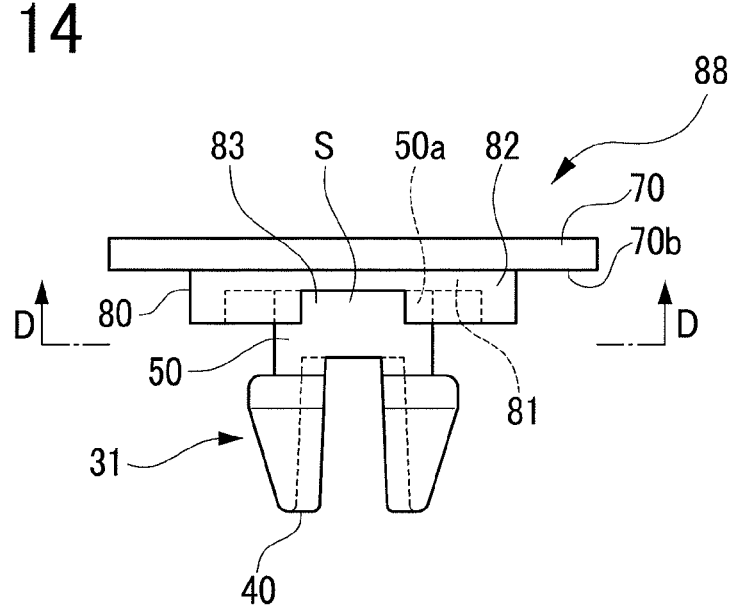
FIG. 14 is a side view showing a sealing member provided in a battery in a modified example.
Figure 15:
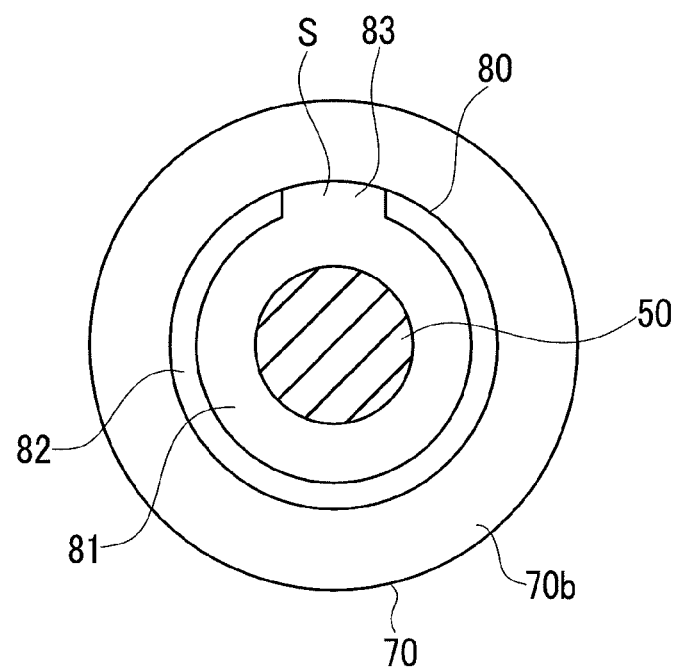
FIG. 15 is a sectional view taken along a line D-D in FIG. 14.

The present invention is explained in the above embodiments but is not limited to each of the above embodiments. The present invention may be embodied in other specific forms without departing from the essential characteristics thereof. In the present embodiment, for instance, the protruding portions 60 each including the extended portion 65 extending radially and the supporting protrusion 61 provided at an end of the corresponding extended portion 65. As an alternative, the protruding portions may be configured as shown in FIGS. 14 and 15. A protruding portion 80 shown in FIGS. 14 and 15 includes an annular extended portion 81 and a cylindrical supporting protrusion 82. The extended portion 81 extends radially in an annular form from an end portion 50a of the shaft portion 50. The supporting protrusion 82 cylindrically extends downward in FIG. 14 from the rear surface 70b of the lid part 70 to surround an outer peripheral edge of the extended portion 81. This supporting protrusion 82 is not continuous over the entire circumference and is partially cut out, forming a cut section 83. Specifically, the supporting protrusion 82 has an annular shape having a partial cutout and surrounds the shaft portion 50 with a clearance (the cut section 83) from the periphery of the shaft portion 50. The height of the supporting protrusion 82 is nearly equal (about 0.55 mm) to the height of the supporting protrusion 61 in the first embodiment. Even this supporting protrusion 82 can generate the space area S (see FIGS. 14 and 15) serving as a gas flow path when the tip portion 40 is positioned in the battery case 110. Even when the sealing member 88 shown in FIG. 14 is used, it is possible in the aforementioned degassing step to reliably release gas from the inside of the battery case 110. Further, after the final sealing, sealing by welding and sealing by the insert part 31 are not doubly provided and thus a welding defect can be detected easily by use of a gas sensor.

In the present embodiment, the tip portion 40 is inserted through the liquid inlet 10 and placed in the battery case 110, thereby temporarily sealing the liquid inlet 10 from the inner surface 113b side of the battery case 110 (see FIG. 7). An alternative is to temporarily seal the liquid inlet 10 from the outer surface 113a side of the battery case 110 without completely passing the tip portion 40 through the liquid inlet 10.

Figure 16:
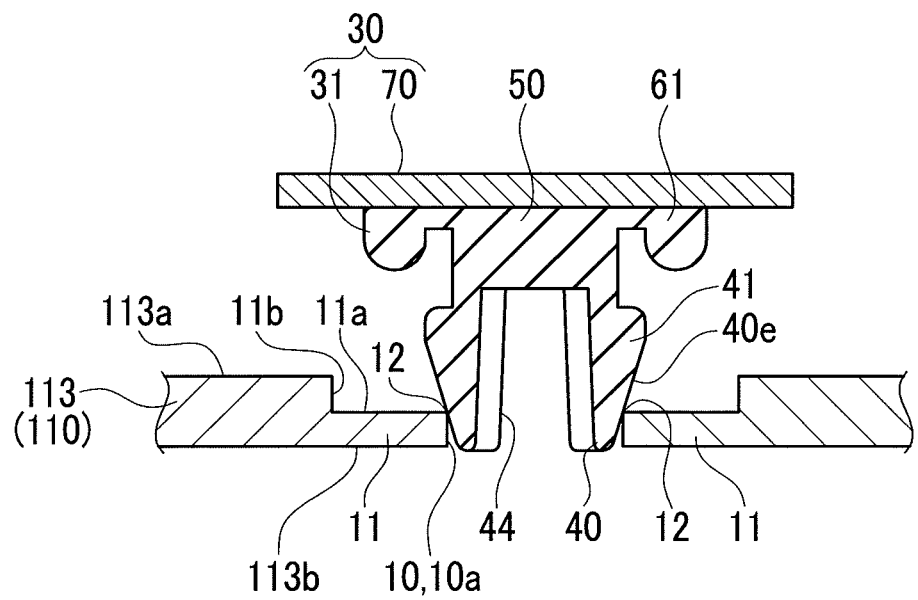
FIG. 16 is an end view showing a battery in another modified example in which a liquid inlet is temporarily sealed with a sealing member.

To be concrete, as shown in FIG. 16, it may be arranged to temporarily seal the liquid inlet 10 by bringing a side surface 40e of a tapered portion 41 of the tip portion 40 in pressure contact with an edge 12 (an edge 12 formed between the inner peripheral surface 10a defining the liquid inlet 10 and the step surface 11a) of the liquid inlet 10 from the upper surface (the outer surface) 113a of the battery case 110. In other words, the tapered portion 41 may be engaged with the circumferential edge portion 11 of the liquid inlet 10 to hermetically seal the liquid inlet 10. In this case, the tapered portion 41 is one example of the engagement portion of the present invention. With such a configuration, of the tip portion 40, the tapered portion 41 contacting with the edge 12 of the liquid inlet 10 is elastically deformed, tightly contacting with the edge 12 of the liquid inlet 10. Thus, hermetical sealing can be achieved between the tip portion 40 and the liquid inlet 10. Since the tip portion 40 is formed with a cutout 44, this cutout 44 has no influence on the sealing property in performing the final sealing as shown in FIG. 16.

In the present embodiment, in the degassing step, the lid part 70 is pressed downward, thereby compressing the supporting protrusions 61 to separate the base end face 40d of the tip portion 40 from the inner surface 113b of the battery case 110 (see FIG. 8). In the variation mentioned above that the liquid inlet 10 is temporarily sealed from the outer surface 113a side of the battery case 110 (see FIG. 16), it may be arranged so that when the tip portion 40 is pushed into the battery case 110 through the liquid inlet 10, the base and face 40d of the tip portion 40 comes to a position apart from the inner surface 113b of the battery case 110 without compression of the supporting protrusions 61. In other words, the separation distance between the supporting protrusions 61 and the tip portion 40 in the plate thickness direction of the circumferential edge portion 11 of the liquid inlet 10 may be set to be larger than the plate thickness of the circumferential edge portion 11 of the liquid inlet 10. In this case, the supporting protrusions 61 support, without being compressed, the lid part 70 before welding in a separate state from the battery case 110.

Figure 17:
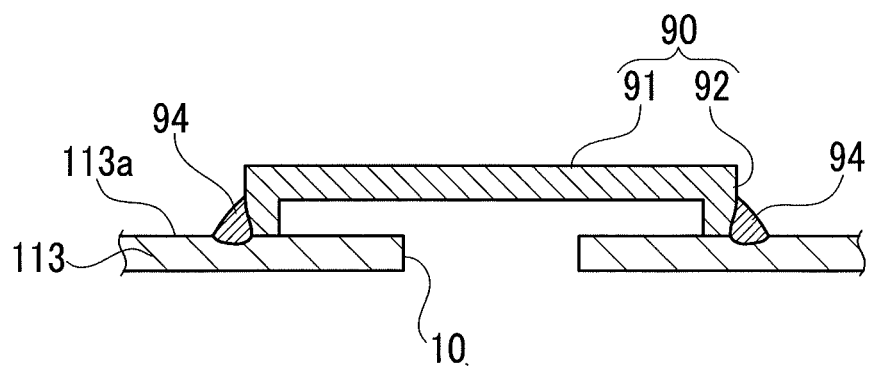
FIG. 17 is a schematic sectional view showing a configuration surrounding a liquid inlet in a battery in another modified example.

In the present embodiment, the circumferential edge portion 11 of the liquid inlet 10 in the case lid member 113 is provided with the step surface 11a positioned below the upper surface 113a (see FIG. 9). A configuration that the step surface 11a is not provided in the case lid member 113 as shown in FIG. 17 may also be adopted. In this case, a lid part 90 has a cap shape including a circular disc-like main part 91 and a cylindrical side part 92 extending downward from an outer peripheral edge of the main part 91. A lower end of this side part 92 is welded to the case lid member 113 (to be concrete, the upper surface 113a around the liquid inlet 10) in final sealing of the liquid inlet 10. A welded area in FIG. 17 is shown as a weld 94. In FIG. 17, although the insert part 31 is not illustrated for easy viewing, the insert part 31 identical in structure to that in the first embodiment is actually joined to a rear surface of the main part 91.

In the first embodiment, the "liquid inlet" is formed as a circular hole; however, the shape of the "liquid inlet" may be arbitrarily changed to for example a rectangular hole. If the shape of the "liquid inlet" is changed to another one, the shape of the tip portion 40 is also appropriately changed accordingly. The position of the "liquid inlet" is also changed.

In the first embodiment, furthermore, the "joining" between the lid part 70 and the hole-surrounding portion 113m of the battery case 110 is performed by welding, but it is not limited thereto. For instance, the "joining" of them may be performed with brazing material or adhesive.

The above embodiments show the lithium ion secondary battery 100 as an example of the sealed battery. As an alternative, the technical concept of the present invention is also adaptable to another type of secondary battery such as a nickel hydride battery and a nickel-cadmium battery. The above embodiments exemplify the battery 100 including the wound power generating element (the electrode body 120), but the technical concept of the present invention may also be applied to a battery having a laminated power generating element. Still further, the above embodiments exemplify the battery 100 having the battery case 110 of a rectangular shape, but the technical concept of the present invention is also applicable to a battery having a battery case of a cylindrical shape, and others.

The second embodiment exemplifies the hybrid vehicle as the vehicle 700 mounting the battery 100 according to the present invention, but it is not limited thereto. Examples of the vehicle 700 which mounts the battery according to the invention may include an electric vehicle, a plug-in hybrid vehicle, a hybrid railway vehicle, a forklift, an electric wheel chair, an electric bicycle, and an electric scooter.

The third embodiment shows exemplifies the hammer drill as the battery using device 800 mounting the battery 100 of the present invention, but it is not limited thereto. The battery using device 800 mounting the battery of the invention may be any of various domestic and office appliances and industrial equipment, such as a personal computer, a mobile phone, a battery-powered electric tool, and an uninterruptible power supplies.

REFERENCE SIGNS LIST

100 Lithium ion secondary battery (Sealed battery)
110 Battery case
117 Electrolyte
10 Liquid inlet
11 Circumferential edge portion
30 Sealing member
40 Distal end portion
40b Base end portion (Engagement portion)
44 Cutout
50 Shaft portion
61 Support protrusion
70 Lid part
S Space area
R Communication path

The invention claimed is:

1. A method for manufacturing a sealed battery including a battery case formed with a liquid inlet for injection of an electrolyte and a sealing member sealing the liquid inlet,
wherein the sealing member includes:
a lid part made of metal, a shaft portion which is an elastic body joined to one surface of the lid part, a supporting protrusion which is an elastic body surrounding, with a clearance, a periphery of an end portion of the shaft portion on a side close to the lid part, and a tip portion which is an elastic body extended from the shaft portion on a side opposite to the lid part,
in an unloaded state, a separation distance between the supporting protrusion and the tip portion is smaller than a plate thickness of a circumferential edge portion of the liquid inlet,
the tip portion includes an engagement portion having a larger diameter than a diameter of the liquid inlet,
the shaft portion has a smaller diameter than the diameter of the liquid inlet and has an shaft length longer than the plate thickness of the circumferential edge portion of the liquid inlet,
the method includes:
a temporary sealing step of bringing the engagement portion in pressure contact with the circumferential edge portion of the liquid inlet to temporarily hermetically seal the liquid inlet after injection of the electrolyte;
an activating step of initially charging the sealed battery after the temporary sealing step;
a degassing step of pushing the tip portion along a direction of the plate thickness of the circumferential edge portion of the liquid inlet after the activating step to such an extent that the lid part does not come into contact with the battery case and the tip portion separates from the circumferential edge portion of the liquid inlet to form a communication path allowing communication between inside and outside of the battery case to release gas generated in the battery case during the activating step; and
a final sealing step of pushing the tip portion in the direction of the plate thickness of the circumferential edge portion of the liquid inlet after the degassing step until the lid part contacts with the battery case to compress the supporting protrusion between the lid part and the battery case, and joining the lid part to the battery case to seal the liquid inlet while the communication path remains formed inside the lid part.

2. The method for manufacturing a sealed battery according to claim 1, wherein the sealing member is a member formed with a cutout in the tip portion, the cutout extending in a direction perpendicular to a direction to push into the liquid inlet.

3. A sealing member of a sealed battery for sealing a liquid inlet for injection of an electrolyte from outside to inside of a battery case, wherein the sealing member includes:

a lid part made of metal, a shaft portion which is an elastic body joined to one surface of the lid part, a supporting protrusion which is an elastic body surrounding, with a clearance, a periphery of an end portion of the shaft portion on a side close to the lid part, and a tip portion which is an elastic body extended from the shaft portion on a side opposite to the lid part, in an unloaded state, a separation distance between the supporting protrusion and the tip portion is smaller than a plate thickness of a circumferential edge portion of the liquid inlet, the tip portion includes an engagement portion having a larger diameter than a diameter of the liquid inlet and is separated from the circumferential edge portion of the liquid inlet in a state where the lid part is joined to the battery case, the shaft portion has a smaller diameter than the diameter of the liquid inlet and has an shaft length longer than the plate thickness of the circumferential edge portion of the liquid inlet, and the supporting protrusion is compressed between the lid part and the battery case in the state where the lid part is joined to the battery case.

4. A sealed battery including a battery case formed with a liquid inlet for injection of an electrolyte and a sealing member sealing the liquid inlet, wherein the sealing member includes:

a lid part made of metal, a shaft portion which is an elastic body joined to one surface of the lid part, a supporting protrusion which is an elastic body surrounding, with a clearance, a periphery of an end portion of the shaft portion on a side close to the lid part, and a tip portion which is an elastic body extended from the shaft portion on a side opposite to the lid part, in an unloaded state, a separation distance between the supporting protrusion and the tip portion is smaller than a plate thickness of a circumferential edge portion of the liquid inlet, the lid part is joined to an outer surface of the battery case and closes the liquid inlet, the tip portion includes an engagement portion having a larger diameter than a diameter of the liquid inlet and is placed in the battery case and in a state separated from the circumferential edge portion of the liquid inlet, the shaft portion has a smaller diameter than the diameter of the liquid inlet and has an shaft length longer than the plate thickness of the circumferential edge portion of the liquid inlet, the shaft portion being located in the liquid inlet, the supporting protrusion is compressed between the lid part and the battery case, and a communication path is provided inside the lid part to allow communication between inside and outside of the battery case.

* * * * *